United States Patent
Nishimura (10) Patent No.: US 9,041,526 B2
(45) Date of Patent: May 26, 2015

(54) DIRECTIONAL INDICATOR FOR A VEHICLE

(75) Inventor: Kozo Nishimura, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 879 days.

(21) Appl. No.: 12/639,974

(22) Filed: Dec. 16, 2009

(65) Prior Publication Data

US 2010/0156621 A1 Jun. 24, 2010

(30) Foreign Application Priority Data

Dec. 18, 2008 (JP) ................................. 2008-322541

(51) Int. Cl.
*B60Q 1/40* (2006.01)
*B60Q 1/42* (2006.01)

(52) U.S. Cl.
CPC ........................................ *B60Q 1/42* (2013.01)

(58) Field of Classification Search
CPC ............ B60Q 1/40; B60Q 1/42; B60Q 1/425; B60Q 1/387; B60Q 1/34; B62J 6/003; H04N 3/20; H04N 5/63; G11C 11/23; F02P 17/02; H01J 29/98
USPC ...................... 340/475, 476, 477, 465, 815.3; 200/52 R, 61.27, 61.28, 61.3, 61.31, 200/61.35, 61.54, 327, 556, 207; 315/77, 315/81, 380; 335/170; 701/1, 36
See application file for complete search history.

(56) References Cited

U.S. PATENT DOCUMENTS

| | | | | |
|---|---|---|---|---|
| 5,581,235 | A | * 12/1996 | Hollstein | ....................... 340/477 |
| 6,884,986 | B2 | * 4/2005 | Doczy et al. | ............... 250/214 R |
| 2002/0015021 | A1 | 2/2002 | Numata et al. | |
| 2005/0133349 | A1 | 6/2005 | Naito | |
| 2009/0321229 | A1 | * 12/2009 | Haug | ......................... 200/61.27 |

FOREIGN PATENT DOCUMENTS

| | | |
|---|---|---|
| CN | 1345078 A | 4/2002 |
| CN | 2910685 Y | 6/2007 |
| EP | 0533141 A1 | 3/1993 |

(Continued)

OTHER PUBLICATIONS

Owner's Manual for Vehicle: Online Edition for Part No. 01 41 0013310-@ 02/07 BMW AG, pp. 61-62.*

(Continued)

*Primary Examiner* — Steven Lim
*Assistant Examiner* — Sisay Yacob
(74) *Attorney, Agent, or Firm* — Roberts Mlotkowski Safran & Cole P.C.

(57) ABSTRACT

A directional indicator includes a momentary type turn signal lever supported to undergo a swing operation and automatically returning to a neutral position after the swing operation, a turn switch operated by the swing operation of the turn signal lever in a first zone for generating a turn signal for informing a driving direction of a vehicle and for setting an auto turn cancel mode for automatically canceling the turn signal, a manual switch operated by the swing operation of the turn signal lever in a second zone for setting a manual mode for manually canceling the turn signal, and a turn signal control section for controlling cancellation of the turn signal based on an operating state of the turn switch and the manual switch.

9 Claims, 5 Drawing Sheets

(56) References Cited

FOREIGN PATENT DOCUMENTS

| | | | |
|---|---|---|---|
| EP | 0945304 | A2 | 9/1999 |
| JP | 2000-355246 | A | 12/2000 |

OTHER PUBLICATIONS

Office Action dated Dec. 7, 2011 issued in corresponding Chinese Application 200910260689.0 with partial English translation.

\* cited by examiner

DIRECTIONAL INDICATOR FOR A VEHICLE

The present application is based on Japanese Patent Application No. 2008-322541 filed on Dec. 18, 2008, the entire contents of which are incorporated herein by reference.

BACKGROUND OF THE INVENTION

1. Field of the Invention

The present invention relates to a directional indicator.

2. Related Art

Conventionally, vehicles are provided with a directional indicator for indicating a driver's intended traveling direction of a vehicle to the other people by lighting indicator lamps provided on front and rear of the vehicle by operating a turn signal lever provided in a vicinity of a steering wheel when, e.g., turning right or left or changing to the next lane.

A directional indicator is often provided with a turn switch for turning on the indicator lamp of the traveling direction of the vehicle by operating a turn signal lever in a direction corresponding to the traveling direction thereof, and a cancellation mechanism for automatically cancelling an indication by returning the turn signal lever to the original position when a steering wheel is pivoted in a direction opposite to an operating direction of the turn signal lever over a predetermined angle and returns. In such a directional indicator, when a turn signal lever is operated in a direction corresponding to a traveling direction of a vehicle and a switch is turned on, an indicator lamp of the traveling direction is lit. Then, when a steering wheel is returned to a straight-ahead position after finishing the turning of the vehicle, the turn signal lever returns to an original position by a cancellation mechanism and an indicator lamp is turned off.

On the other hand, a vehicle directional indicator has been proposed which includes an indicator lamp for informing a steering direction of a vehicle, a direction-indicating means for lighting the above-mentioned indicator lamp by an input operation, a light extinction means for turning off the lit indicator lamp, wherein the above-mentioned light extinction means includes a first light extinction means for turning off the indicator lamp by detecting the steering direction of the vehicle and outputting a light extinction signal when the steering direction is changed to a direction opposite to the direction inputted by the direction-indicating means and a second light extinction means for turning off the indicator lamp by outputting a light extinction signal after a predetermined time from the moment of the input by the direction-indicating means (see JP-A 2000-355246). The direction-indicating means in which the turn cancellation control is carried out in an auto mode has a structure for automatically returning to a neutral state after tilting right or left by the input operation of the turn signal lever (a momentary switch).

According to the above-mentioned directional indicator of JP-A 2000-355246, since the direction-indicating means has a structure for automatically returning, an operation for manually returning the direction-indicating means is not necessary, it is possible to omit operation steps of the driver, and thus, a driving operation can be safely carried out.

However, according to the directional indicator of JP-A 2000-355246, when the turn cancellation control is carried out in an auto mode in all cases, it is necessary to carry out the turn cancellation control at an optimal timing. Thus, there is a problem that it is necessary to carry out a precise control based on information about road condition or traffic situation of a driving destination, thereby a high cost system.

THE SUMMARY OF THE INVENTION

Therefore, it is an object of the invention to provide a vehicle directional indicator having an auto turn cancellation mechanism by a low-cost system in case that the directional indicator is composed of a momentary switch.

(1) According to one embodiment of the invention, a directional indicator comprises:

a momentary type turn signal lever supported to undergo a swing operation and automatically returning to a neutral position after the swing operation;

a turn switch operated by the swing operation of the turn signal lever in a first zone for generating a turn signal for informing a driving direction of a vehicle and for setting an auto turn cancel mode for automatically canceling the turn signal;

a manual switch operated by the swing operation of the turn signal lever in a second zone for setting a manual mode for manually canceling the turn signal; and a turn signal control section for controlling cancellation of the turn signal based on an operating state of the turn switch and the manual switch.

In the above embodiment (1), the following modifications and changes can be made.

(i) A swing operation range of the turn signal lever includes the first zone that allows the swing operation of the turn signal lever up to a predetermined angle from the neutral position, and the second zone that allows the swing operation up to a predetermined angle from an outer edge of the first zone.

(ii) The directional indicator further comprises an informing portion for allowing an operator to be aware of the setting of the manual mode when the turn signal lever is in the swing operation in the second zone.

(iii) The directional indicator further comprises a moderation mechanism for allowing an operator to be aware of the setting of the manual mode when the turn signal lever is in the swing operation in the second zone.

(iv) The moderation mechanism comprises a protruding portion formed on a steering column side to be contacted with an end portion of the turn signal lever.

(v) The directional indicator further comprises a pressure-sensitive mechanism for allowing an operator to be aware of the setting of the manual mode when the turn signal lever is in the swing operation in the second zone.

(vi) The pressure-sensitive mechanism comprises a pressure-sensitive element provided on the turn signal lever, and a stress applied to the pressure-sensitive element changes according to an angle of the swing operation in the second zone.

(vii) A swing operation range of the turn signal lever includes the second zone that allows the swing operation of the turn signal lever up to a predetermined angle from the neutral position and the first zone that allows the swing operation up to a predetermined angle from an outer edge of the second zone.

(viii) The turn signal lever is swung to a first operative position in the first zone so as to turn on the turn switch and to set the auto turn cancel mode, and the turn signal lever is swung to a second operative position in the second zone so as to turn on the manual switch, to invalidate the auto turn cancel mode and to set the manual mode.

(ix) The turn signal lever automatically returns to an operation neutral position when an operation force is released at the first or second operative position.

Points of the Invention

According to one embodiment of the invention, a directional indicator of a momentary switch type is constructed such that a manual mode position for turning on a manual switch is provided within the swing operation zone of a turn signal lever so as to allow a manual cancellation of turn signal. Therefore, it is not necessary to carry out a precise control based on information about road condition or traffic situation of a driving destination, and it is thereby possible to realize an auto turn cancellation mechanism by a low-cost system.

BRIEF DESCRIPTION OF THE DRAWINGS

Next, the present invention will be explained in more detail in conjunction with appended drawings, wherein.

DESCRIPTION OF THE PREFERRED EMBODIMENTS

First Embodiment

Figure 1:
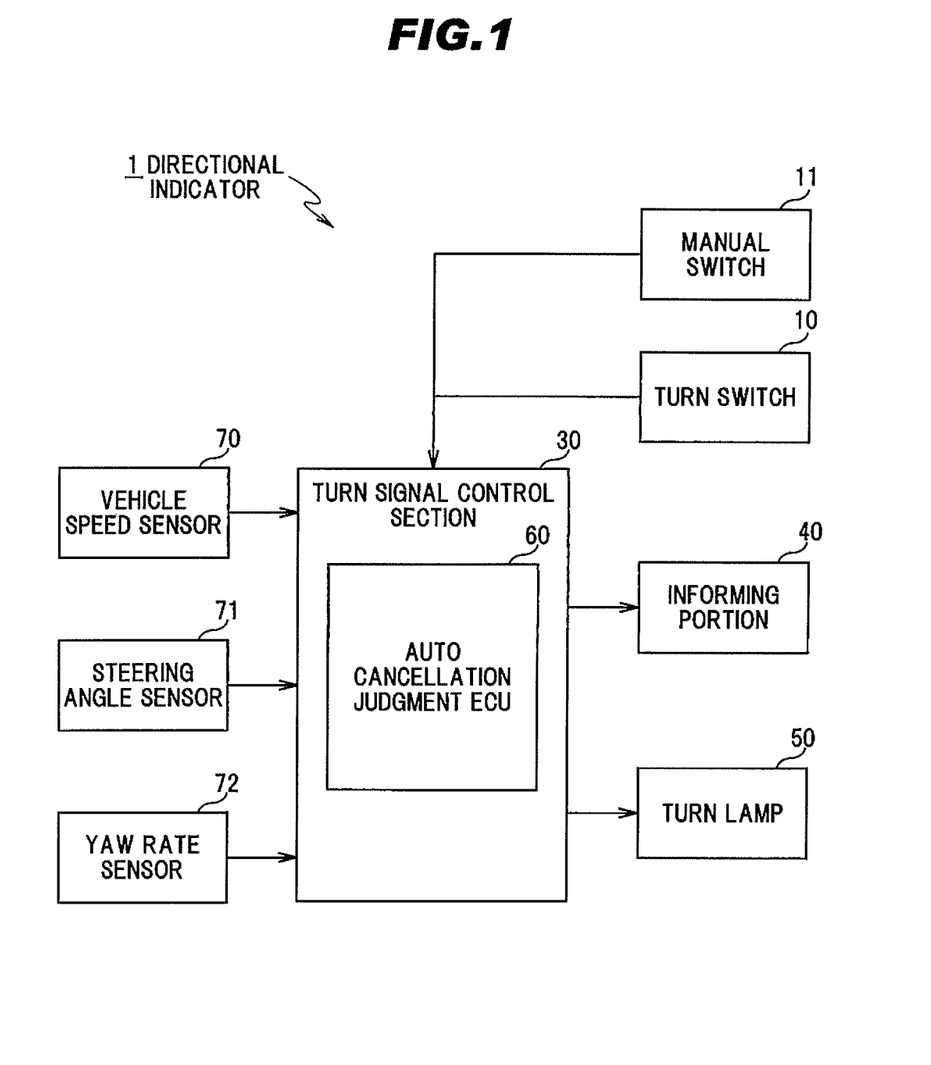
FIG. 1 is a schematic block diagram showing a directional indicator in a preferred embodiment of the present invention.
Figure 2:
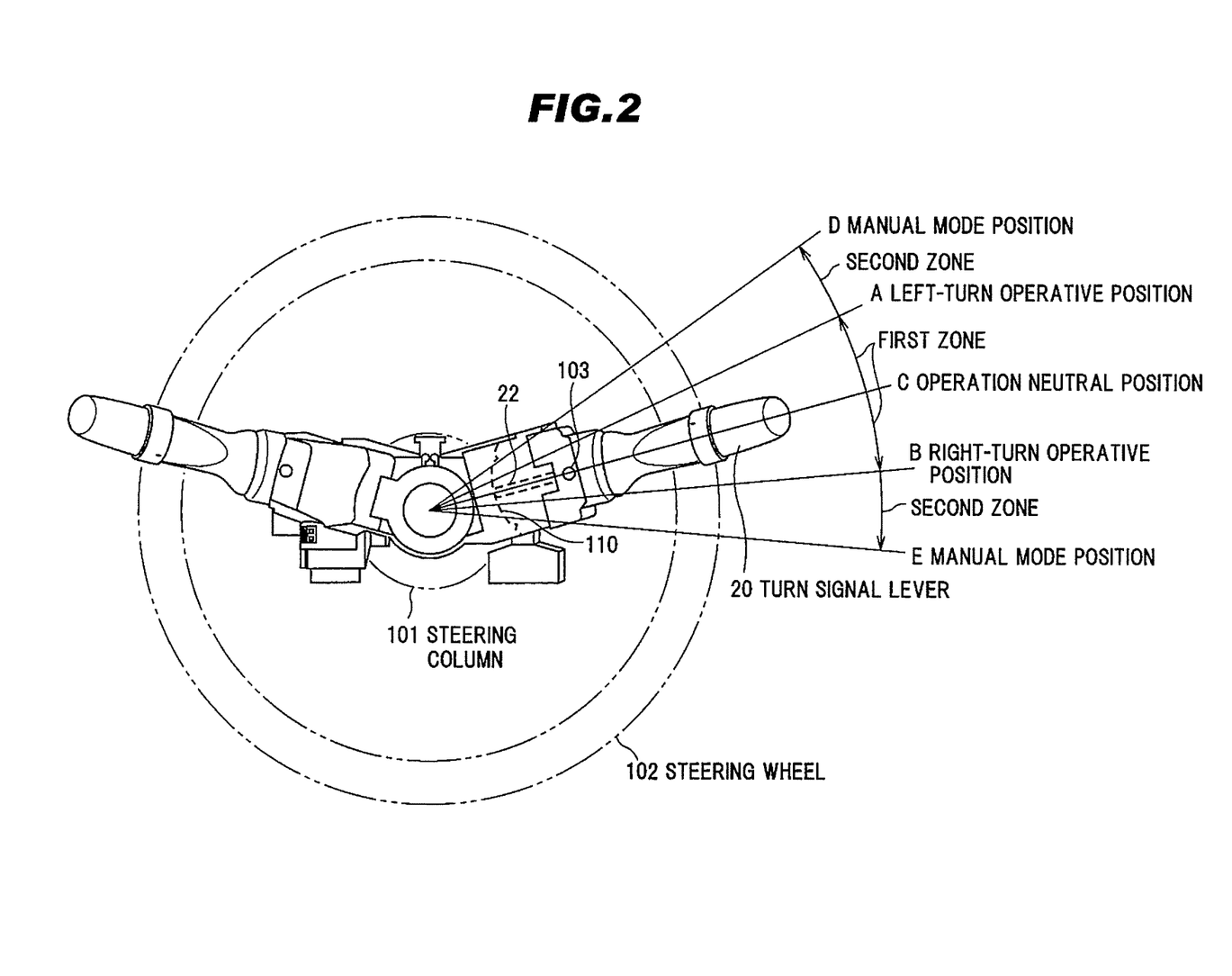
FIG. 2 is a front view showing a turn signal lever mounted behind a steering wheel when viewed from a driver's side.
Figure 3:
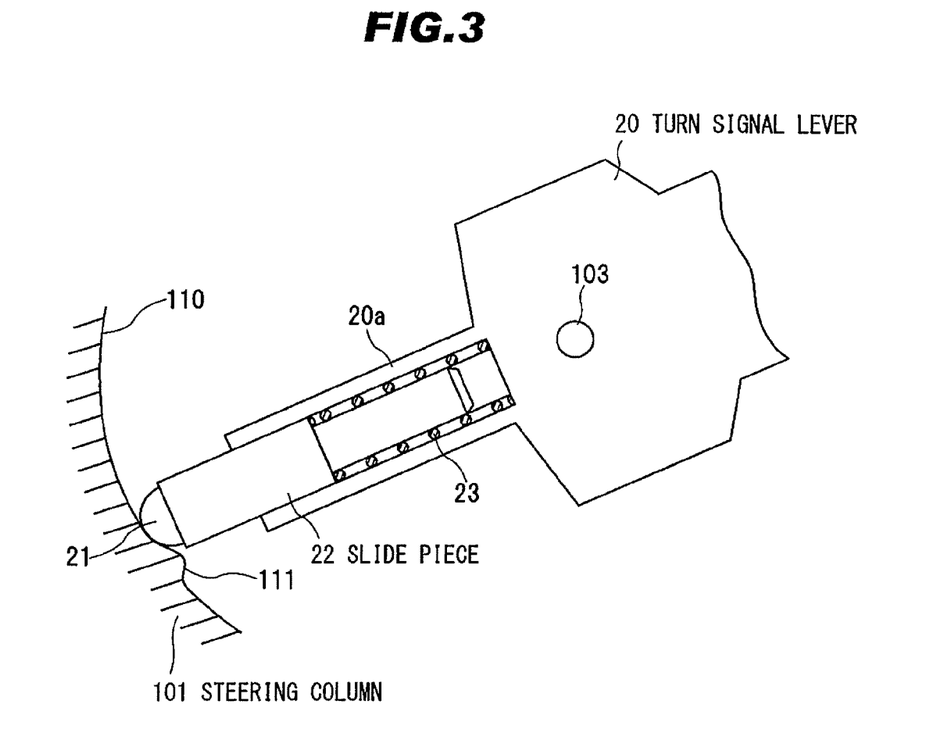
FIG. 3 is a partial cross sectional view showing a moderation mechanism provided inside a turn signal lever 20.
Figure 4:
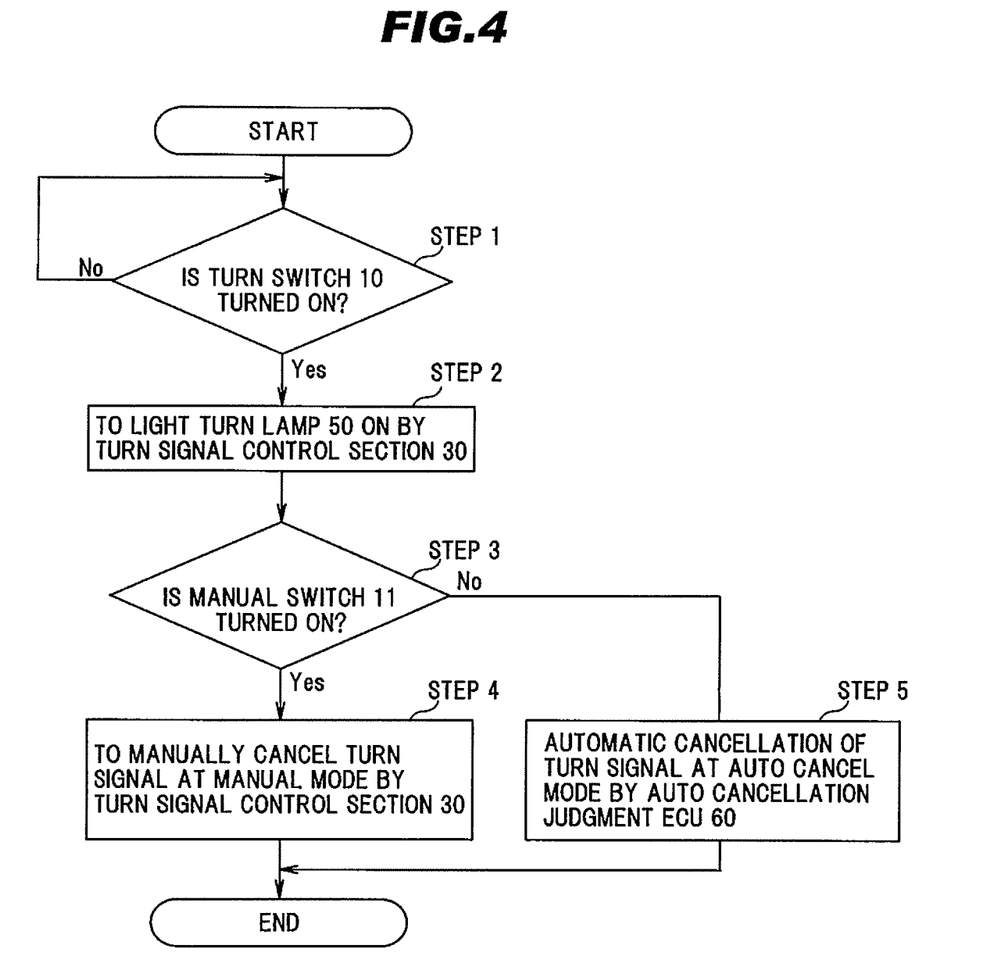
FIG. 4 is a flow chart showing an operation of the directional indicator.

FIG. 1 is a schematic block diagram showing a directional indicator in an embodiment of the invention. FIG. 2 is a front view showing a turn signal lever mounted behind a steering wheel when viewed from a driver's side. FIG. 3 is a partial cross sectional view showing a moderation mechanism provided inside a turn signal lever 20. FIG. 4 is a flow chart showing an operation of the directional indicator.

A directional indicator 1 in the embodiment of the invention is configured to have a turn signal lever 20 which is supported so as to allow a swing operation and automatically returns to a neutral position after the swing operation, a turn switch 10 operated by the swing operation of the turn signal lever 20 in a first zone for generating a turn signal for informing a driving direction of a vehicle and for setting an auto turn cancel mode for automatically cancelling the turn signal, a manual switch 11 operated by the swing operation of the turn signal lever 20 in a second zone for setting a manual mode for manually cancelling the turn signal, a turn signal control section 30 for controlling the cancellation of the turn signal based on an operating state of the turn switch and the turn switch 10 and the manual switch 11, and an informing portion 40 for informing the above-mentioned manual mode setting by a means such as sound, vibration or light.

The directional indicator 1 is to carry out a direction indicating operation for informing a traveling direction of a driven vehicle to drivers of other vehicles, etc., by lighting a pair of right and left turn lamps 50 provided on front and rear of the vehicle.

As shown in FIG. 2, the directional indicator 1 is operated through the turn signal lever 20 provided on a steering column 101 of the vehicle. The turn signal lever 20 is arranged behind a steering wheel 102 which is indicated by a two-dot chain line in FIG. 2, when viewed by a driver. A distal end of the turn signal lever 20 is rotatably supported inside the steering column 101, and the turn signal lever 20 is protruded outside of the steering column 101. The distal end of the turn signal lever 20 is swingably supported to the steering column 101 in a direction along a rotation direction of the steering wheel 102 within a predetermined angle around a rotation axis 103 of the turn signal lever 20 arranged therein.

A central axis of the turn signal lever 20 is maintained at an operation neutral position C shown in FIG. 2. The turn signal lever 20 swings to a left-turn operative position A around the rotation axis 103 of the turn signal lever 20 when swung in a counterclockwise direction in the first zone from the state of being maintained at the operation neutral position C. As a result, left turn lamps 50 each provided on the front and rear of the vehicle are lit. When the operation force by the swing operation is released, the turn signal lever 20 automatically returns to the operation neutral position C by a function of a non-illustrated return mechanism. In other words, the turn signal lever 20 is configured as a momentary switch which is a momentary type lever and returns to the operation neutral position C each time. Even after the turn signal lever 20 returns to the operation neutral position C, the left turn lamp 50 continues to be lit.

When the turn signal lever 20 is swung in the above-mentioned first zone, a turn switch 10 is turned on that is shown in FIG. 1 and provided at a position corresponding to where the turn signal lever 20 swings to the left-turn operative position A. As shown in FIG. 1, an output of the turn switch 10 is input to the turn signal control section 30, and the auto turn cancel mode for automatically cancelling the turn signal is set.

When the turn signal lever 20 is further operated in a counterclockwise direction from in the second zone the left-turn operative position A, the turn signal lever 20 swings to a manual mode position D. When the turn signal lever 20 is swung to the manual mode position D, the manual switch 11 shown in FIG. 1 is turned on. As shown in FIG. 1, an output of the manual switch 11 is input to the turn signal control section 30 for invalidating the auto turn cancel mode which has been already set. When the operation force by the swing operation to the manual mode position D is released, the turn signal lever 20 automatically returns to the operation neutral position C by the function of the non-illustrated return mechanism.

In addition, in the same manner, the turn signal lever 20 swings to a right-turn operative position B around the rotation axis 103 of the turn signal lever 20 when swung in a clockwise direction in the first zone from the state of being maintained at the operation neutral position C. As a result, right turn lamps 50 each provided on the front and rear of the vehicle are lit. When the operation force by the swing operation is released, the turn signal lever 20 automatically returns to the operation neutral position C by the function of the non-illustrated return mechanism. Even after the turn signal lever 20 returns to the operation neutral position C, the right turn lamp 50 continues to be lit.

When the turn signal lever 20 is swung in the above-mentioned first zone, a turn switch 10 shown in FIG. 1 provided at a position corresponding to where the turn signal lever 20 swings to the right-turn operative position B is turned on. As shown in FIG. 1, an output of the turn switch 10 is input to the turn signal control section 30, and the auto turn cancel mode for automatically cancelling the turn signal is set.

When the turn signal lever 20 is further operated in a clockwise direction in the second zone from the right-turn operative position B, the turn signal lever 20 swings to a manual mode position E. When the turn signal lever 20 is swung to the manual mode position E, the manual switch 11 shown in FIG. 1 is turned on. As shown in FIG. 1, an output of the manual switch 11 is input to the turn signal control section 30 for invalidating the auto turn cancel mode which has been already set. When the operation force by the swing operation to the manual mode position E is released, the turn signal lever 20 automatically returns to the operation neutral position C by the function of the non-illustrated return mechanism.

FIG. 3 is a partial cross sectional view showing a moderation mechanism provided inside the turn signal lever 20. The turn signal lever 20 is swingably and rotatably supported around the central axis 103. A slide piece 22 having a contact portion 21 at an end portion thereof and a coil spring 23 are slidably supported by a supporting portion 20a inside the turn signal lever 20, thereby providing a moderation mechanism. A contact surface 110 in contact with the contact portion 21 of the moderation mechanism is formed on the steering column 101 side, and a protruding portion 111 protruding toward the slide piece 22 is formed on the contact surface 110 at positions corresponding to the manual mode positions D and E shown in FIG. 2.

When the turn signal lever 20 is swung, the slide piece 22 moves within the first and second zones shown in FIG. 2 in a state that the contact portion 21 is in contact with the contact surface 110 by the coil spring 23 at substantially constant contact pressure. Since the protruding portion 111 is formed near the end of the second zone, i.e., at the positions corresponding to the manual mode positions D and E, the slide piece 22 is pressed by the protruding portion 111. As a result, moderation feeling (click feeling) is generated at the positions corresponding to the manual mode positions D and E when the turn signal lever 20 is swung. However, the swing operation is not locked by the protruding portion 111, and the turn signal lever 20 automatically returns to the operation neutral position C by the function of the non-illustrated return mechanism when the operation of the turn signal lever 20 is terminated.

The turn switch 10, which is provided so as to correspond to the left-turn operative position A and the right-turn operative position B shown in FIG. 2 for carrying out the switching operation by the above-mentioned swing operation of the turn signal lever 20, is connected to the turn signal control section 30 as shown in FIG. 1. In addition, the manual switch 11, which is provided so as to correspond to the manual mode positions D and E shown in FIG. 2 for carrying out the switching operation, is connected to the turn signal control section 30. The turn signal control section 30 has a control unit for controlling the lighting of the left and right turn lamps 50 as a turn signal based on the switching operation of the turn switch 10 by the left-turn or right-turn operation of the turn signal lever 20.

Here, the turn signal control section 30 controls the cancellation of the turn signal based on the operating state of the turn switch 10 and the manual switch 11. The turn signal control section 30 has an auto turn cancellation judgment ECU (Electric Control Unit) 60 for automatically cancelling the turn signal by judging a predetermined condition after the generation of the turn signal due to the swing operation of the turn signal lever 20. A vehicle speed sensor 70, a steering angle sensor 71 and a yaw rate sensor 72 are connected to the auto turn cancellation judgment ECU 60, and the auto turn cancel mode for automatically cancelling the turn signal is set by judging the predetermined condition based on sensor outputs thereof.

In addition, when the manual switch 11 is turned on, the turn signal control section 30 sets the manual mode for manually cancelling the turn signal by invalidating the above-mentioned auto turn cancel mode after the generation of the turn signal due to the swing operation of the turn signal lever 20.

The speed sensor 70 detects speed of the driven vehicle, and outputs a vehicle speed detection signal in accordance with the detected speed to the turn signal control section 30.

When the steering wheel 102 is rotationally operated by a driver, the steering angle sensor 71 detects a steering angle which is a rotation angle of the steering wheel 102, and outputs a steering angle detection signal in accordance with the detected steering angle to the turn signal control section 30. In other words, the steering angle sensor 71 detects in which direction, right or left, the steering wheel 102 is rotationally operated on the basis of a steering angle middle point (a steering angle while driving the vehicle straight), and outputs steering angle information of positive value on the basis of the steering angle middle point as a steering angle detection signal in any case. The steering angle information includes steering direction information which indicates in which direction, right or left, the steering wheel 102 is steered.

The yaw rate sensor 72 detects a yaw rate (behavior of the vehicle in a rotation direction) at the time of, e.g., turning the vehicle right and left or changing the lane, and outputs a yaw rate detection signal in accordance with the detected yaw rate to the turn signal control section 30.

Informing Portion

As shown in FIG. 1, the informing portion 40 is connected to the turn signal control section 30. When the manual switch 11 is turned on, the informing portion 40 informs to drivers, etc., by sound or light, that the auto turn cancel mode by the auto turn cancellation judgment ECU 60 is invalidated and the manual mode is set, so as to be easily recognizable.

The informing portion 40 is, e.g., a sound whistling portion which generates a sound of electronic sound or an announcement, or a light-emitting part such as a LED or a lamp which emits light. Alternatively, the informing portion 40 may be other means as long as the drivers, etc., can easily recognize that the manual mode is set, for example, it may be a display by vibration, letters or graphics, etc.

The sound whistling portion for generating sound, electronic sound or an announcement can be, e.g., a speaker mounted on a driver's side door which can be commonly used as a speaker used for an on-vehicle audio device.

In addition, as an example of the informing portion 40 which emits light, it is possible to provide a light-emitting part. The light-emitting part is, e.g., composed of a LED or a lamp, etc., is mounted on, e.g., an A-pillar where is easily recognizable to the driver, and informs that the manual mode is set so as to be easily recognizable to the driver, etc.

Operation of the Directional Indicator

The operation of the directional indicator will be explained following the flow chart shown in FIG. 4. When the vehicle is driven, the auto turn cancellation judgment ECU 60 constantly monitors whether or not the turn switch 10 is turned on at a predetermined time interval (Step 1). When it is judged that the turn switch 10 is turned on, the process proceeds to Step 2, and when it is not judged that the turn switch 10 is turned on, Step 1 is repeated.

When it is judged that the turn switch 10 is turned on, the turn signal control section 30 controls the lighting of the left and right turn lamps 50 corresponding to the left-turn operative position A and the right-turn operative position B shown in FIG. 2 (Step 2). In addition, the auto turn cancel mode for automatically cancelling the turn signal is set.

After lighting the turn lamp 50, the auto turn cancellation judgment ECU (Electric Control Unit) 60 judges whether or not the manual switch 11 is turned on (Step 3). When it is judged that the manual switch 11 is turned on, the process proceeds to Step 4, and when it is not judged that the manual switch 11 is turned on, the process proceeds to Step 5.

When it is judged that the manual switch 11 is turned on, the auto turn cancel mode which has been set in Step 2 is invalidated and the manual mode for manually cancelling the turn signal is set. In the manual mode, the turn signal lever 20 which has returned to the operation neutral position C is swung in a reverse direction, and it is thereby possible to manually cancel the turn signal (Step 4). Alternatively, it is possible to set such that the turn signal is manually cancelled by swinging the turn signal lever 20 in the same direction again.

For example, when the left turn lamp 50 is lit by swinging the turn signal lever 20 to the left-turn operative position A in the first zone shown in FIG. 2 and the manual mode is set by the further swing operation of the turn signal lever 20 in a counterclockwise direction in the second zone from the left-turn operative position A to the manual mode position D, the turn signal is manually cancelled by swinging the turn signal lever 20 from the operation neutral position C to the right-turn operative position B.

In addition, it is possible to set such that the turn signal is manually cancelled when a steering angle being a cancel preparation angle of $\theta1$ or more is generated and the steering angle subsequently becomes a cancel angle of $\theta2$ or less. The cancel preparation angle $\theta1$ is an angle for determining the validation or invalidation of the cancellation at an absolute value of the steering angle, and the cancel angle $\theta2$ is an angle for tuning off the turn signal when the steering is operated over the cancel preparation angle $\theta1$ and is returned.

For example, the turn signal is manually cancelled in case that, after the manual mode is set by swinging the turn signal lever 20 to the manual mode position D shown in FIG. 2, the steering is operated until the steering angle exceeds the cancel preparation angle $\theta1$ and is subsequently returned by operating the steering in a reverse direction, and then, the steering angle becomes the cancel angle of $\theta2$ or less.

In addition, when the manual mode is set, it is informed by sound or light so that the driver, etc., can easily recognize.

When it is not judged that the manual switch 11 is turned on, the auto turn cancel mode which has been set in Step 2 is valid, and the turn signal is automatically cancelled (Step 5).

Automatic Cancellation of Turn Signal by Auto Turn Cancel Mode

The automatic cancellation of the turn signal in Step 5 is carried out as follows. When the direction indicating operation is started, the auto turn cancellation judgment ECU 60 provided in the turn signal control section 30 detects the driving condition of the vehicle from elapsed time from the start time, driving speed of the vehicle, a steering angle and a yaw rate, etc., and determines the auto turn cancel for terminating the direction indicating operation of the directional indicator 1 based on the driving condition. Then, the direction indicating operation by lighting the turn lamp 50 is automatically terminated based on the auto turn cancellation judgment.

The auto turn cancellation judgment ECU 60 counts the elapsed time after lighting the turn lamp 50 using a timer provided therein. When the certain time over the generally expected duration of the direction indicating operation has passed in a state that the steering wheel 102 is not operated after starting the direction indicating operation and the vehicle is driven at more than certain speed, the auto turn cancellation judgment ECU 60 judges that a condition to terminate the direction indicating operation (an auto turn cancellation condition) is established and carries out the auto turn cancellation judgment for carrying out the auto turn cancellation. Based on the auto turn cancellation judgment, the turn signal control section 30 stops supplying drive current to the turn lamp 50 by outputting a signal for terminating the direction indicating operation, and turns the light off.

In addition, a ROM connected to the auto turn cancellation judgment ECU 60 stores the cancel preparation angle $\theta1$ and the cancel angle $\theta2$ which is smaller than cancel preparation angle $\theta1$. After starting the direction indicating operation, the auto turn cancellation judgment ECU 60 detects variation in a steering angle $\theta$ of the steering wheel 102 through the steering angle sensor 71. Then, when the steering angle $\theta$ reaches the cancel preparation angle $\theta1$ ($\theta > \theta1$) and substantially falls within the cancel angle $\theta2$ ($\theta < \theta2$), the auto turn cancellation judgment ECU 60 judges that the auto turn cancellation condition is established and determines to terminate the direction indicating operation of the turn lamp 50. As a result, for example, as is in the case of turning right or left at an intersection, etc., and subsequently driving straight, when the steering wheel 102 reaches the cancel preparation angle $\theta1$ in a direction indicated by the turn lamp 50 and subsequently returns within the cancel angle $\theta2$, the auto turn cancellation is determined based on the steering angle $\theta$ and the direction indicating operation is automatically terminated.

After lighting the turn lamp 50, the auto turn cancellation judgment ECU 60 detects variation in the yaw rate (a variation amount of a rotation angle in a turning direction of the vehicle per unit time) based on the yaw rate detection signal by the yaw rate sensor 72. A judgment reference value to be a reference of the auto turn cancellation judgment is stored in the ROM of the auto turn cancellation judgment ECU 60 for each vehicle speed region. In general, the yaw rate changes so as to respectively reach maximum and minimum values between the start and end of direction change of the vehicle such as right- or left-turn or a lane change. When the yaw rate is below the judgment reference value after reaching the maximum value or when the yaw rate exceeds the judgment reference value after reaching the minimum value, the auto turn cancellation judgment ECU 60 judges that the auto turn cancellation condition is established.

In addition, the auto turn cancellation judgment ECU 60 detects (calculates) a variation amount of the steering angle $\theta$ based on the steering angle detection signal from the steering angle sensor 71. A judgment reference value to be a judgment reference for carrying out the auto turn cancellation judgment is stored in the ROM of the auto turn cancellation judgment ECU 60 for each vehicle speed region. In general, in the same manner as the yaw rate, the steering angle $\theta$ changes so as to reach maximum and minimum values between the start and end of the direction change of the vehicle. When the steering angle $\theta$ is below the judgment reference value after reaching the maximum value or when the steering angle $\theta$ exceeds the judgment reference value after reaching the minimum value, the auto turn cancellation judgment ECU 60 judges that the auto turn cancellation condition is established. The auto turn cancellation judgment ECU 60 carries out the auto turn cancellation judgment for terminating the direction indicating operation of the turn lamp 50 when any one of the auto turn cancellation condition based on the yaw rate or that based on the steering angle $\theta$ is established.

After lighting the turn lamp 50, the auto turn cancellation judgment ECU 60 detects variation in the yaw rate (a variation amount of a rotation angle in a turning direction of the vehicle per unit time) based on the yaw rate detection signal by the yaw rate sensor 72. A judgment reference value to be a reference of the auto turn cancellation judgment is stored in the ROM of the auto turn cancellation judgment ECU 60 for each vehicle speed region. In general, the yaw rate changes so as to respectively reach maximum and minimum values between the start and end of the direction change of the vehicle such as right- or left-turn or a lane change. The yaw rate is used for calculating vehicle driving speed, time and horizontal travel distance of the vehicle, and it is judged that the auto turn cancellation condition is established when the travel distance exceeds the judgment reference.

As a result, for example, as is in the case of changing to the adjacent lane, even when the variation in the yaw rate in a direction indicated by the turn lamp 50 is small or even when the variation amount of the steering angle θ is small and the steering angle θ of the steering wheel 102 does not reach the cancel preparation angle θ1, the auto turn cancellation judgment is carried out based on the variation in the yaw rate. In other words, even if the auto turn cancellation condition based on the above-mentioned variation steering angle θ of the yaw rate is not established, when the auto turn cancellation condition based on the variation amount yaw rate of the steering angle θ is established, the auto turn cancellation for the direction indicating operation is determined, and the direction indicating operation is automatically terminated not only at the time of turning right or left at an intersection, etc., but also at the time of, e.g., changing to the adjacent lane.

Effect of the First Embodiment

The first embodiment of the invention has the following effects.
(1) When the directional indicator 1 is composed of a momentary switch, it is possible to configure the auto turn cancellation mechanism by a low-cost system. In other words, the manual mode position for turning on the manual switch 11 is provided within the swing operation zone of the turn signal lever 20, and it is thereby possible to manually cancel the turn signal. As a result, it is not necessary to carry out a precise control based on information about road condition or traffic situation of a driving destination, and it is thereby possible to realize the auto turn cancellation mechanism by the low-cost system.
(2) By providing the informing portion 40, the drivers, etc., can easily recognize that the auto turn cancel mode is invalidated and the manual mode is set. Especially, when the turn signal lever 20 is a momentary switch, since the turn signal lever 20 automatically returns to the operation neutral position C even if swung to the manual mode positions D and E, the information about the manual mode from the informing portion 40 assists the driving operation, and has an effect for the safe driving.
(3) In the low-cost system, by carrying out the auto turn cancellation control at the ECU, frustrating operations are eliminated by using the momentary type turn signal lever 20, and it is thereby possible to improve operability of the turn signal lever 20 by the selectable operation mode.

Second Embodiment

Figure 5:
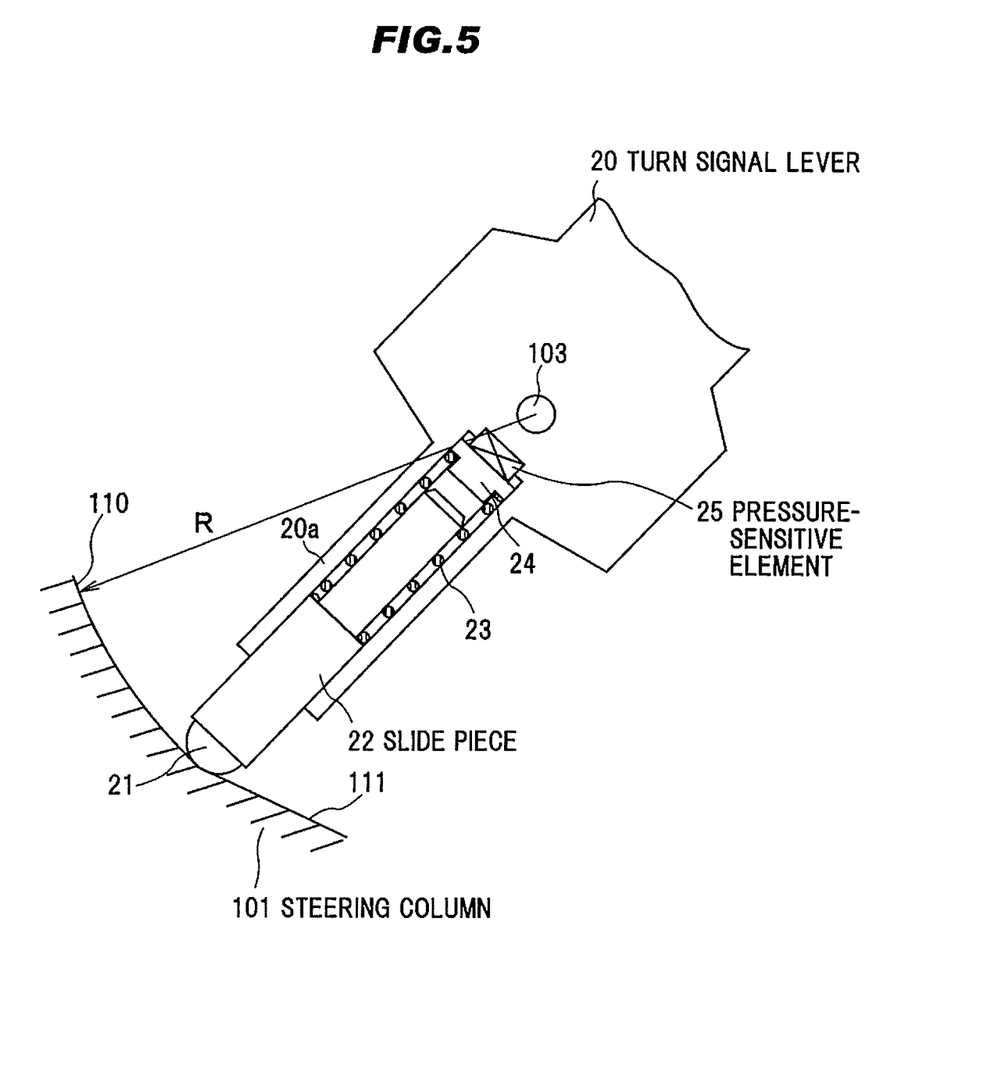
FIG. 5 is a partial cross sectional view showing an example of a mechanism that operational feeling continuously changes in a second embodiment of the invention.

FIG. 5 is a partial cross sectional view showing an example of a mechanism that operational feeling continuously changes. Similarly to FIG. 3, the turn signal lever 20 is swingably and rotatably supported around the rotation axis 103. A slide piece 22 having a contact portion 21 at an end portion thereof and a coil spring 23 are slidably supported by a supporting portion 20a inside the turn signal lever 20. A pressure-sensitive element 25 pressed via the slide piece 22 which is pressed by the below-described contact surface 110 and slidably moves, the coil spring 23 and a pressing element 24 is arranged at the bottom of the supporting portion 20a.

The contact surface 110 to which the contact portion 21 contacts is formed within a substantially constant radius R from the rotation axis 103 of the turn signal lever 20. The contact surface 110 is formed corresponding to the first zone shown in FIG. 2. In addition, the contact surface 110 is formed so that the above-mentioned radius R gradually decreases corresponding to the second zone shown in FIG. 2. Therefore, when the turn signal lever 20 is swung to the manual mode position D or E within the second zone shown in FIG. 2, the slide piece 22 is pushed and slidably moves to the rotation axis 103 side.

When the turn signal lever 20 is swung within the first zone shown in FIG. 2, the slide piece 22 is not pushed to the rotation axis 103 side and does not slidably move. Therefore, a stress applied to the pressure-sensitive element 25 is less than certain value. On the other hand, when the turn signal lever 20 is swung within the second zone shown in FIG. 2, the slide piece 22 is pushed and slidably moves to the rotation axis 103 side. Therefore, when the turn signal lever 20 is swung to the manual mode position D or E, the stress applied to the pressure-sensitive element 25 increases to the certain value or more. As a pressure-sensitive element, it is possible to use a known element such as semiconductor diaphragm type, capacitance type or piezoelectric type.

In the above-mentioned swing operation of the turn signal lever 20, it is possible to set the auto turn cancel mode when the stress applied to the pressure-sensitive element 25 is less than certain value, and to set the manual mode when the stress applied to the pressure-sensitive element 25 is the certain value or more. As a result, it is possible to have a mechanism in which the stress is applied to the pressure-sensitive element 25 from the front of the manual mode position D or E of the turn signal lever 20, thereby a system which can reflect the intention of the driver.

It should be noted that the present invention is not intended to be limited to the above-mentioned embodiments, and the various kinds of embodiments can be implemented without departing from the gist of the present invention. For example, the auto turn cancel mode and the manual mode can be set such that the first and second zones shown in FIG. 2 is reversed. In addition, it is possible to configure the embodiment of the invention without providing the informing portion 40. Alternatively, it is possible to configure without the yaw rate sensor 72 since the steering angle sensor 71 can be a substitute thereof for the yaw rate information.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:
1. A directional indicator, comprising:
   a momentary type turn signal lever supported to undergo a swing operation by a user and automatically returning to a neutral position after the swing operation;
   a turn switch operated by the swing operation of the momentary type turn signal lever in a first operative position in a first zone for generating a turn signal for informing a driving direction of a vehicle and for setting an auto turn cancel mode for automatically canceling the turn signal independently of the automatic return to the neutral position of the turn signal lever;
   a manual switch operated by the swing operation of the momentary type turn signal lever in a second operative position in a second zone for setting a manual mode for keeping the turn signal turned on and invalidating the auto turn cancel mode, the momentary type turn signal lever automatically returning to the neutral position after the manual mode is set and the momentary type turn signal lever is released, wherein the turn signal stays turned on until another swing operation of the momen- tary type turn signal lever is conducted after the momentary type turn signal lever automatically returns to the neutral position to manually cancel the turn signal; and a turn signal control section for controlling cancellation of the turn signal based on an operating state of the turn switch and the manual switch, wherein in the auto turn cancel mode the turn signal is automatically cancelled based on a signal generated from the turn signal control section based on changes in the movement of the vehicle including a combination of vehicle speed, steering angle and yaw rate, and wherein the auto turn cancel mode and the manual mode are each always accompanied by the automatic returning of the momentary type turn signal lever upon release by the user.

2. The directional indicator according to claim 1, wherein a swing operation range of the turn signal lever includes the first zone that allows the swing operation of the turn signal lever up to a predetermined angle from the neutral position, and the second zone that allows the swing operation up to a predetermined angle from an outer edge of the first zone.

3. The directional indicator according to claim 1, further comprising:

an informing portion for allowing an operator to be aware of the setting of the manual mode when the turn signal lever is in the swing operation in the second zone.

4. The directional indicator according to claim 1, further comprising:

a moderation mechanism for allowing an operator to be aware of the setting of the manual mode when the turn signal lever is in the swing operation in the second zone.

5. The directional indicator according to claim 4, wherein the moderation mechanism comprises a protruding portion formed on a steering column side to be contacted with an end portion of the turn signal lever.

6. The directional indicator according to claim 1, further comprising:

a pressure-sensitive mechanism for allowing an operator to be aware of the setting of the manual mode when the turn signal lever is in the swing operation in the second zone.

7. The directional indicator according to claim 6, wherein the pressure-sensitive mechanism comprises a pressure-sensitive element provided on the momentary type turn signal lever, and a stress applied to the pressure-sensitive element changes according to an angle of the swing operation in the second zone.

8. The directional indicator according to claim 1, wherein a swing operation range of the turn signal lever includes the second zone that allows the swing operation of the momentary type turn signal lever up to a predetermined angle from the neutral position and the first zone that allows the swing operation up to a predetermined angle from an outer edge of the second zone.

9. A directional indicator, comprising:

a momentary type turn signal lever supported to undergo a swing operation by a user and automatically returning to a neutral position after the swing operation;

a turn switch operated by the swing operation of the momentary type turn signal lever in a first operative position in a first zone for generating a turn signal for informing a driving direction of a vehicle and for setting an auto turn cancel mode for automatically canceling the turn signal independently of the automatic return to the neutral position of the turn signal lever;

a manual switch operated by the swing operation of the momentary type turn signal lever in a second operative position in a second zone for setting a manual mode for keeping the turn signal turned on and invalidating the auto turn cancel mode, the momentary type turn signal lever automatically returning to the neutral position after the manual mode is set and the momentary type turn signal lever is released, wherein the turn signal stays turned on until another swing operation of the momentary type turn signal lever is conducted after the momentary type turn signal lever automatically returns to the neutral position to manually cancel the turn signal; and a turn signal control section for controlling cancellation of the turn signal based on an operating state of the turn switch and the manual switch, wherein in the auto turn cancel mode the turn signal is automatically cancelled based on a signal generated from the turn signal control section based on changes in the movement of the vehicle including steering angle and at least one of the group consisting of vehicle speed and yaw rate, and wherein the auto turn cancel mode and the manual mode are each always accompanied by the automatic returning of the momentary type turn signal lever upon release by the user.

* * * * *